(12) United States Patent
Foster et al.

(10) Patent No.: US 7,185,755 B1
(45) Date of Patent: Mar. 6, 2007

(54) SLAT CONVEYOR HAVING CONVEYING SLATS AND LIFTING/HOLDING SLATS

(75) Inventors: Raymond Keith Foster, Madras, OR (US); Scott Michael Delamarter, Tacoma, WA (US)

(73) Assignee: Keith Investments, LLC, Madras, OR (US)

( * ) Notice: Subject to any disclaimer, the term of this patent is extended or adjusted under 35 U.S.C. 154(b) by 0 days.

(21) Appl. No.: 11/335,008

(22) Filed: Jan. 18, 2006

(51) Int. Cl.
*B65G 25/04* (2006.01)
*B65G 25/00* (2006.01)

(52) U.S. Cl. ............................. 198/750.2; 198/750.14; 198/750.1

(58) Field of Classification Search ............. 198/750.2, 198/750.3, 750.4, 750.5, 751, 775, 750.1, 198/750.14
See application file for complete search history.

(56) References Cited

U.S. PATENT DOCUMENTS

| | | | | |
|---|---|---|---|---|
| 5,325,957 A | * | 7/1994 | Wilkens ................. | 198/750.2 |
| 5,588,522 A | * | 12/1996 | Foster et al. ............. | 198/775 |
| 5,664,663 A | * | 9/1997 | Wilkens ................. | 198/750.1 |
| 5,806,660 A | * | 9/1998 | Foster .................... | 198/750.3 |
| 6,439,375 B1 | * | 8/2002 | Foster et al. ............. | 198/775 |
| 6,739,447 B2 | * | 5/2004 | Verhaeghe .............. | 198/750.1 |
| 2006/0180439 A1 | * | 8/2006 | Foster ..................... | 198/750.3 |

* cited by examiner

*Primary Examiner*—Gene O. Crawford
*Assistant Examiner*—Ramya G. Prakasam
(74) *Attorney, Agent, or Firm*—Delbert J. Barnard

(57) ABSTRACT

A conveyor comprises laterally spaced apart lifting/holding slats (12) and laterally spaced apart conveying slats (10) between the lifting/holding slats (12). The conveying slats (10) are advanced in a first direction for conveying a load and are retracted in a second direction for returning them to a start position. The lifting/holding slats (12) have lower portions (62) which reciprocate and upper portions (60) which move up and down. Cams (92, 94) operate in response to longitudinal movement of the lower portions (62) to raise and lower the upper portions (60).

10 Claims, 16 Drawing Sheets

SLAT CONVEYOR HAVING CONVEYING SLATS AND LIFTING/HOLDING SLATS

TECHNICAL FIELD

This invention relates to reciprocating slat conveyors of the type having a set of movable slats for conveying a load and a set of lifting/holding slats for lifting and holding a load while the movable slats are being retracted.

BACKGROUND OF THE INVENTION

The background technology for the present invention is disclosed in U.S. Pat. No. 5,588,522, granted Dec. 31, 1996, to Raymond Keith Foster, and in U.S. Pat. No. 6,439,375, granted Aug. 27, 2002, also to Raymond Keith Foster. The disclosures of these patents are incorporated herein.

There is a need for slat constructions that will facilitate the manufacture, installation and operation of the conveying slats and the lifting/holding slats. The principal object of the present invention is to fill this need.

BRIEF SUMMARY OF THE INVENTION

The conveyor slat of the present invention comprises a top, a pair of opposite sidewalls depending from the top, and a pair of bottom flanges extending laterally inwardly from bottom portions of the sidewalls. A horizontal partition wall extends between and interconnects the sidewalls below the top and above the bottom flanges. At least one reinforcement wall extends between and interconnects the top and the partition wall.

In the preferred embodiment, the conveyor slat is an extrusion and the reinforcement wall extends substantially vertically and divides the space below the top and above the horizontal partition into two elongated chambers.

The lifting/holding slat of the invention comprises an elongated lower portion and an elongated upper portion. The lower portion comprises a top, opposite sidewalls depending from the top, bottom flanges extending laterally inwardly from bottom portions of the sidewalls, and lock flanges extending laterally outwardly from upper side regions of the lower portion. The upper portion has a top, sidewalls extending downwardly from the top, and bottom flanges extending laterally inwardly from the sidewalls, below the lock flanges on the lower portion. The upper portion is movable vertically relative to the lower portion and has an upper position in which the bottom flanges on the upper portion are up close to or against the lock flanges on the lower portion.

The lower portion of the conveying slat may include an elongated seal-retaining slot on at least one of its sides. Preferably, the embodiment that includes a seal-retaining slot has an elongated seal-retaining slot on each of its sides.

The upper portion of the conveying slat may include an elongated seal-retaining slot on at least one of its sides. Preferably, the embodiment that includes a seal-retaining slot has an elongated seal-retaining slot on each of its sides.

The lower portion of the slat is adapted to set down on at least one bearing having a top, sidewalls, lock recesses at the bottoms of the sidewalls, and wings extending laterally outwardly from the side recesses and beyond. The top of the lower portion is adapted to sit down on the top of the bearing. The bottom flanges of the lower portion are adapted to extend into the side recesses on the bearing. The bottom flanges on the lower portion are adopted to set down on the wings. The lower portion is adapted to move back and forth longitudinally on the bearing.

In a preferred conveyor of the invention, comprising both the conveying slats and lifting/holding slats, the conveying slats are preferably spaced laterally apart and the lifting/holding slats are spaced laterally apart and are positioned between the conveying slats. The upper portion of the lifting/holding slat has an "up" position in which the bottom flanges on the upper portion are up against the lock flanges on the lower portion. The top of the upper portion is above the top of the conveying slats. The upper portion has a "down" position in which the bottom flanges are spaced vertically below the lock flanges on the lower portion and the top of the upper portion is below the top of the conveying slats.

In the preferred embodiment of the conveyor, the bottom portion of each lifting/holding slat includes a first cam element and the upper portion of the slat includes a second cam element. The first and second cam elements are housed within the upper portion of the slat, vertically between the top of the lower portion and the top of the upper portion. The lower portion of the slat is adapted to be moved longitudinally to cause the cam elements on it to slide relative to the cam elements on the upper portion. The cam elements are adapted to raise the upper portion of the lifting/holding slat relative to the lower portion, when moved in one direction, and to lower the upper portion relative to the lower portion, when moved in the opposite direction.

Preferably, there is a connector member at one end of each upper portion. The connector member includes a first end that is pivotally connected to the upper portion and a second end that is pivotally connected to an anchor structure positioned endwise of the end of the upper portion. This connection allows the upper portion to move up and down in response to the action of the cam elements without moving longitudinally.

Preferably, there are end bearings connected to the anchor structure that have elongated end portions that extend into the upper portions of the conveying slats.

These and other objects, advantages and features of the present invention will become apparent from the description of the best mode set forth below, from the drawings, from the claims and from the principles that are embodied in the specific structures that are illustrated and described.

BRIEF DESCRIPTION OF THE SEVERAL VIEWS OF THE DRAWINGS

Like reference numerals are used to designate like parts throughout the several views of the drawing, and.

DETAILED DESCRIPTION OF THE ILLUSTRATED EMBODIMENT

Figure 1:
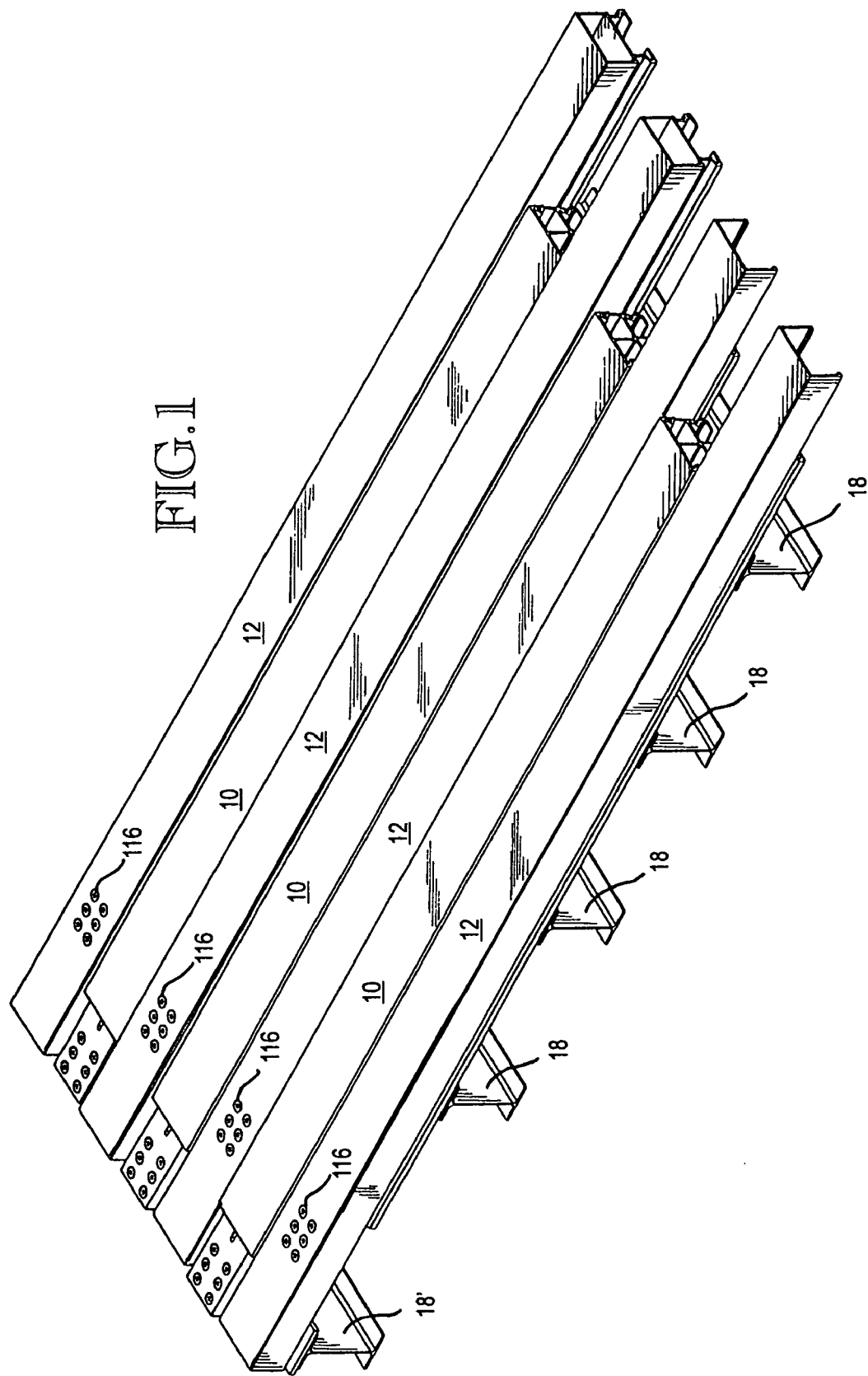
FIG. 1 is a fragmentary pictorial view of a slat conveyor embodying the present invention, such view being taken from above and looking towards the top, one side and the discharge end of the conveyor.

The aforementioned U.S. Pat. No. 6,439,375 discloses a conveyor for moving palletized loads, composed of conveying slats and lifting/holding slats. The conveying slats are spaced laterally apart across the width of the conveyor. The lifting/holding slats are also spaced laterally apart and they are positioned between the conveying slats. The embodiments shown by FIGS. 47–52 of U.S. Pat. No. 6,439,375 disclose lifting/holding slats having upper slat portions that are moved back and forth in the longitudinal direction. Cams function to lift the upper portions of the slat members in response to their longitudinal movement in one direction and to lower them in response to their longitudinal movement in the opposite direction.

The slat conveyor of the present invention is for moving palletized loads and other similar type loads wherein the articles themselves have fixed-form wide bases that span several slats. The length and width of the conveyor can vary substantially. In the drawings, only a portion of a conveyor is illustrated. In the width direction, a substantial number of the slats are omitted. In the length direction, the slats are shown in a shortened form. By way of example, the true length may be in the order of forty to fifty feet. The conveyor may be between twenty and twenty-four slats wide, for example, with each slat being between four and six inches in width, for example.

Figure 2:
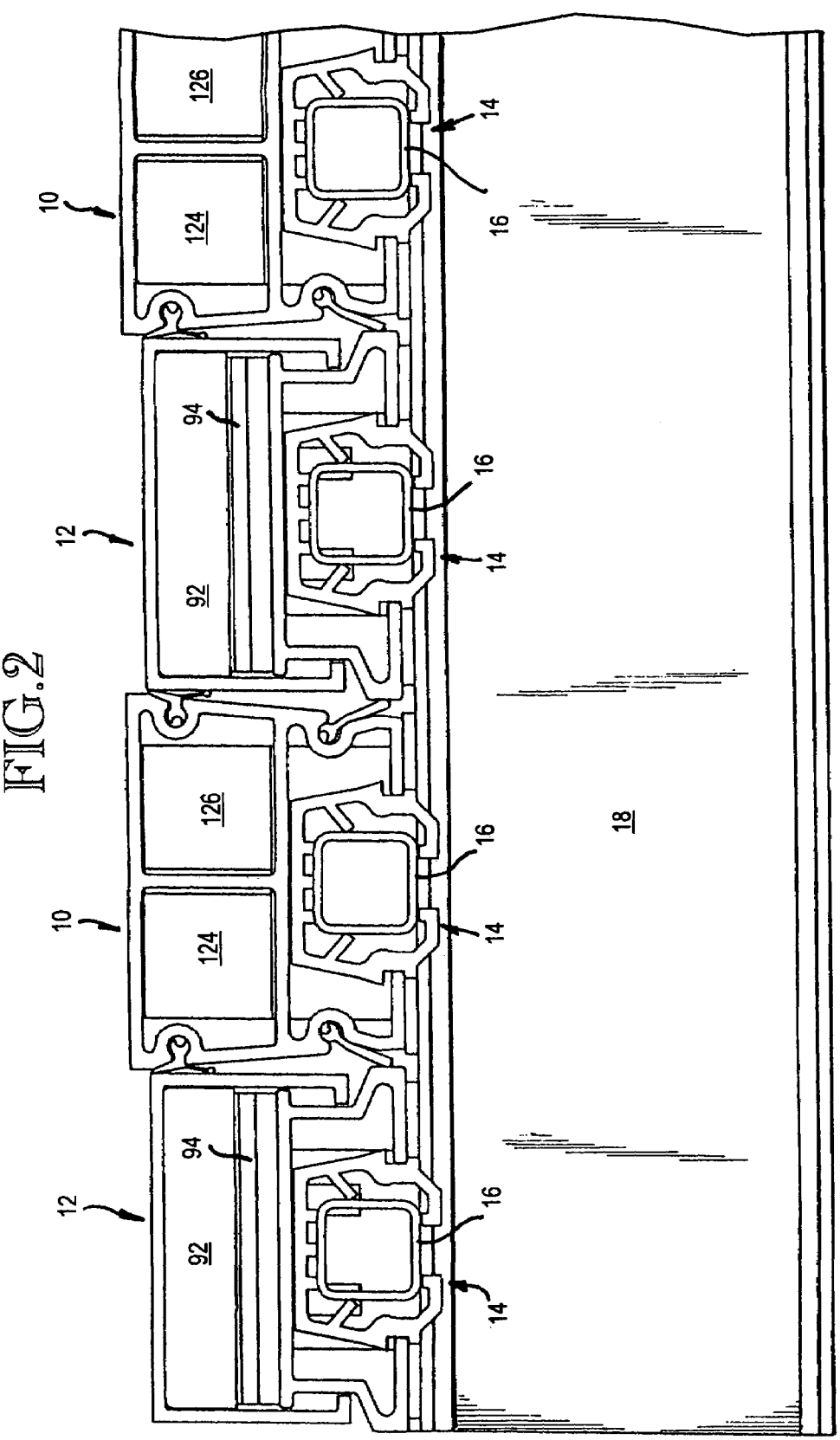
FIG. 2 is a fragmentary end elevational view of the conveyor components shown by FIG. 1, such view showing the lifting/holding slats in lowered or "down" positions.
Figure 3:
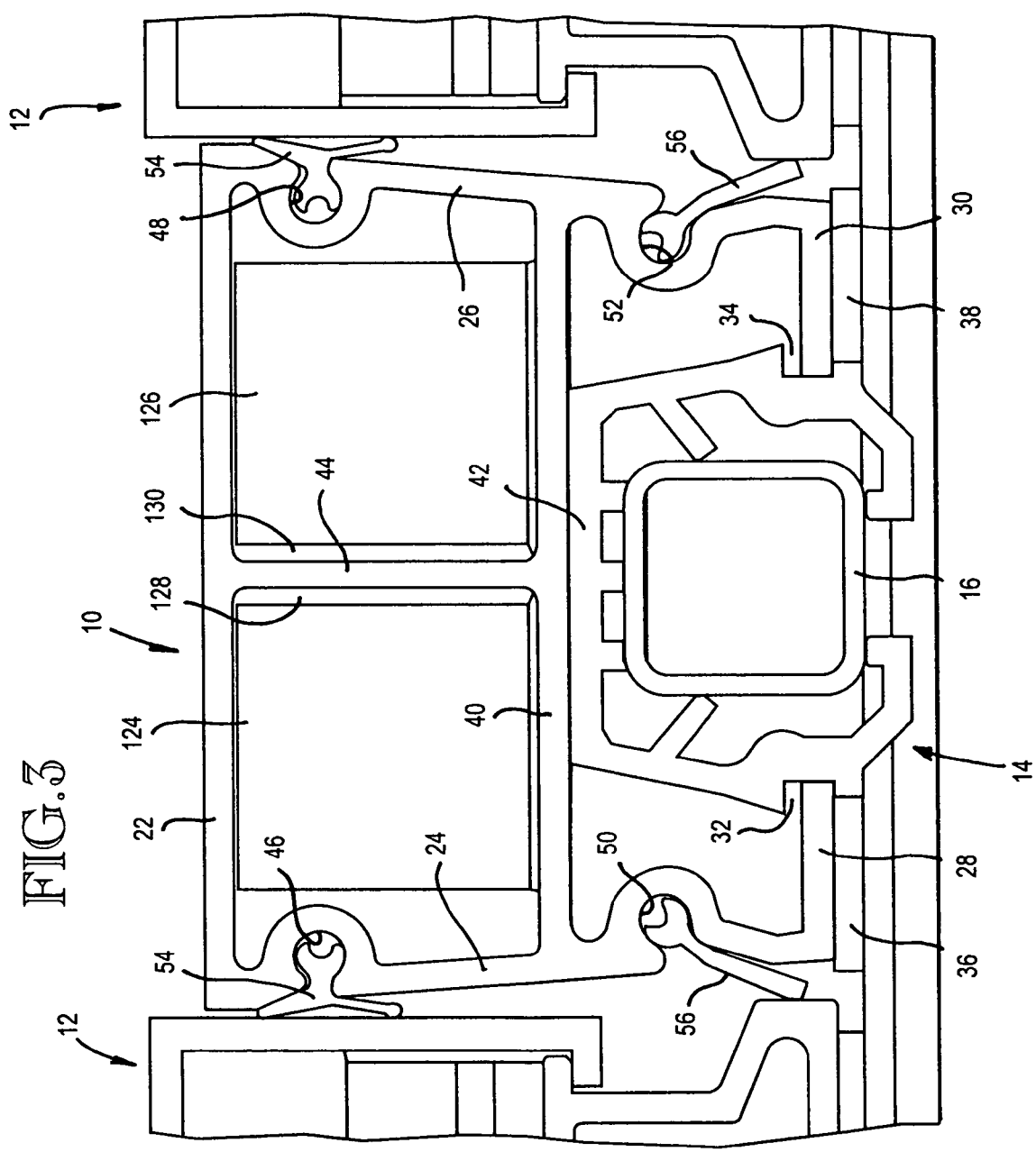
FIG. 3 is an enlarged scale end view of one of the conveying slats.

Referring to FIGS. 1–3, the conveyor is shown to comprise a plurality of elongated conveying slats 10 and a plurality of elongated lifting/holding slats 12. The conveying slats 10 are spaced laterally apart and the lifting/holding slats 12 are spaced laterally apart. Each conveying slat 10 is positioned between two adjacent lifting/holding slats 12. In the illustrated embodiment, the side slats are lifting/holding slats 12. However, a conveying slat 10 may be located where each lifting/holding slat 12 is illustrated and a lifting/holding slat may be positioned where each conveying slat 10 is illustrated.

The conveying slats 10 are supported by and slide on slide bearings 14 which are preferably like the slide bearings disclosed in U.S. Pat. No. 4,785,929, granted Nov. 22, 1998, to Raymond K. Foster. The contents of U.S. Pat. No. 4,785,929 are hereby incorporated herein by this specific reference. The bearings 14 rest on and are supported by longitudinal beams 16 which extend over and are secured to transverse frame members 18, such as by welding. As disclosed in U.S. Pat. No. 4,785,929, the bearings 14 snap down onto the beams 16.

The conveying slats 10 have upper and lower portions. The upper portion has a top 22 which contacts the load. Slat 10 also comprises sidewalls 24, 26 and bottom flanges 28, 30. The bottom flanges 28, 30 extend inwardly from the sidewalls 24, 26 and have inner edges that are received in side recesses 32, 34 in the bearing 14. The bearing 14 includes side wings 36, 38 that project laterally outwardly below the bottom flanges 28, 30. A horizontal partition wall 40 extends between the sidewalls 24, 26 and divides the conveyor slat 10 into upper and lower portions 18, 20. Partition wall 40 rests on the top 42 of the bearing 14. Bottom flanges 28, 30 rest on the wings 36, 38. Preferably, a vertical reinforcement wall 44 extends between and interconnects the top 22 and the partition 40.

In the illustrated embodiment, the sidewalls 24, 26 include a pair of upper seal strip recesses 46, 48 and a pair of lower seal strip recesses 50, 52 (FIG. 3). Elongated seal strips 54 are received within the seal recesses 46, 48. Elongated seal strips 56 are received within the recesses 50, 52. In use, the conveying slats 10 reciprocate on the bearings 14, from a start position to an advanced position and back to the start position. By way of typical and, therefore, non-limitive example, the stroke may be about one foot in length.

Figure 13:
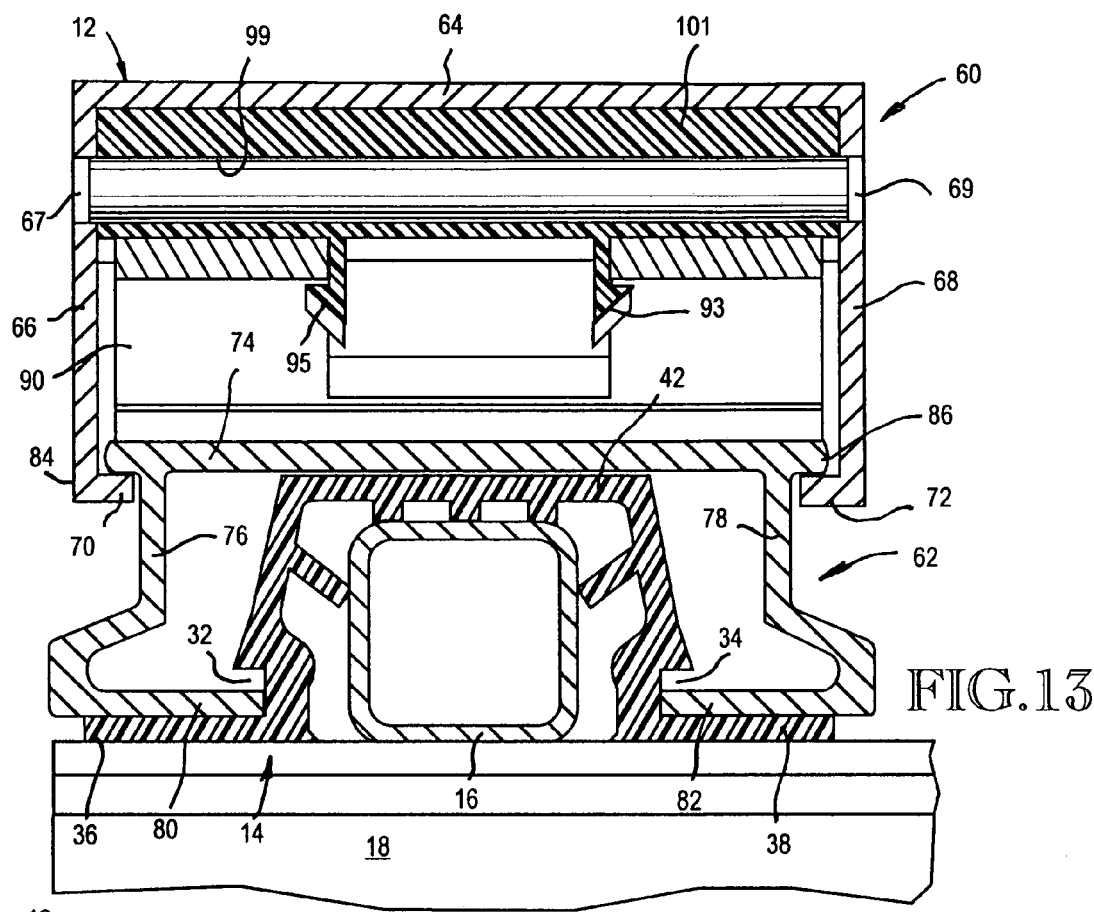
FIG. 13 is a transverse sectional view taken substantially along line 13—13 of FIG. 12.
Figure 14:
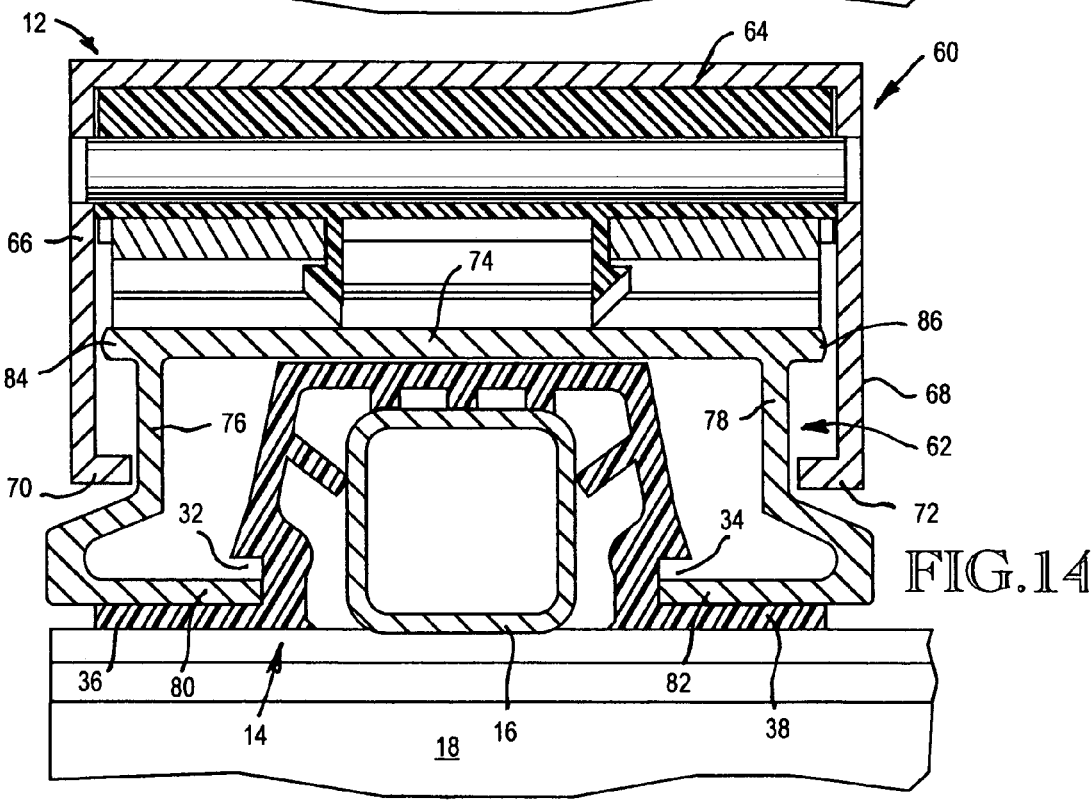
FIG. 14 is a transverse sectional view taken substantially along line 14—14 of FIG. 11.

As best shown by FIGS. 13 and 14, the lifting/holding slats comprise an upper portion 60 and a lower portion 62. The upper portion 60 has a top 64, sidewalls 66, 68 extending downwardly from the top 64 and inwardly directed flanges 70, 72 extending laterally inwardly from the sidewalls 66, 68, in confronting, co-planar parallelism. The bottom portion 62 has a top 74, opposite sidewalls 76, 78, bottom flanges 80, 82 and lock flanges 84, 86. The lock flanges 84, 86 project laterally outwardly from upper regions of the sidewalls 76, 78 and may constitute outward extensions of the top 74. The upper portion 60 of lifting/holding slat 12 is movable vertically between an "up" position, shown in FIG. 13 and a "down" position, shown in FIG. 14. In the "up" position, the bottom flanges 70, 72 are substantially in contact with the lock flanges 84, 86. In the "down" position, the flanges 70, 72 are spaced below the flanges 84, 86.

The conveying slat 10 and the upper and lower portions 60, 62 of the lifting/holding slats 12 are preferably extrusions and are preferably made from a structural aluminum alloy. However, the invention does not depend on the materials or manufacturing methods that are used for these parts. An elongated chamber 90 is formed in the upper portion 60, vertically between the top 64 of the upper portion 60 and the top 74 of the lower portion 62. This chamber houses upper and lower cams 92, 94. Cams 92 are attached to the upper portions 60 of the slats 12 and cams 94 are connected to the lower portion 62 of the slats 12.

Referring to FIGS. 6–10, and FIG. 8 in particular, the transverse frame member 18' at the forward end of the conveyor serves as an anchor for connectors 100 and end bearings 102. Each connector 100 comprises a fixed end block 104, connected to the frame member 18', such as by screws 106, and a movable block 108 that is connected to the upper portion 60 of the lifting/holding slat 12. A connecting link 110 is pivotally connected at its opposite ends to the blocks 104, 108, such as by pivot pins 112, 114. The blocks 108 may be connected to the tops 64 of the upper portions 60 of the lifting/holding slats 12, such as by use of screws 116 (FIG. 1).

Figure 4:
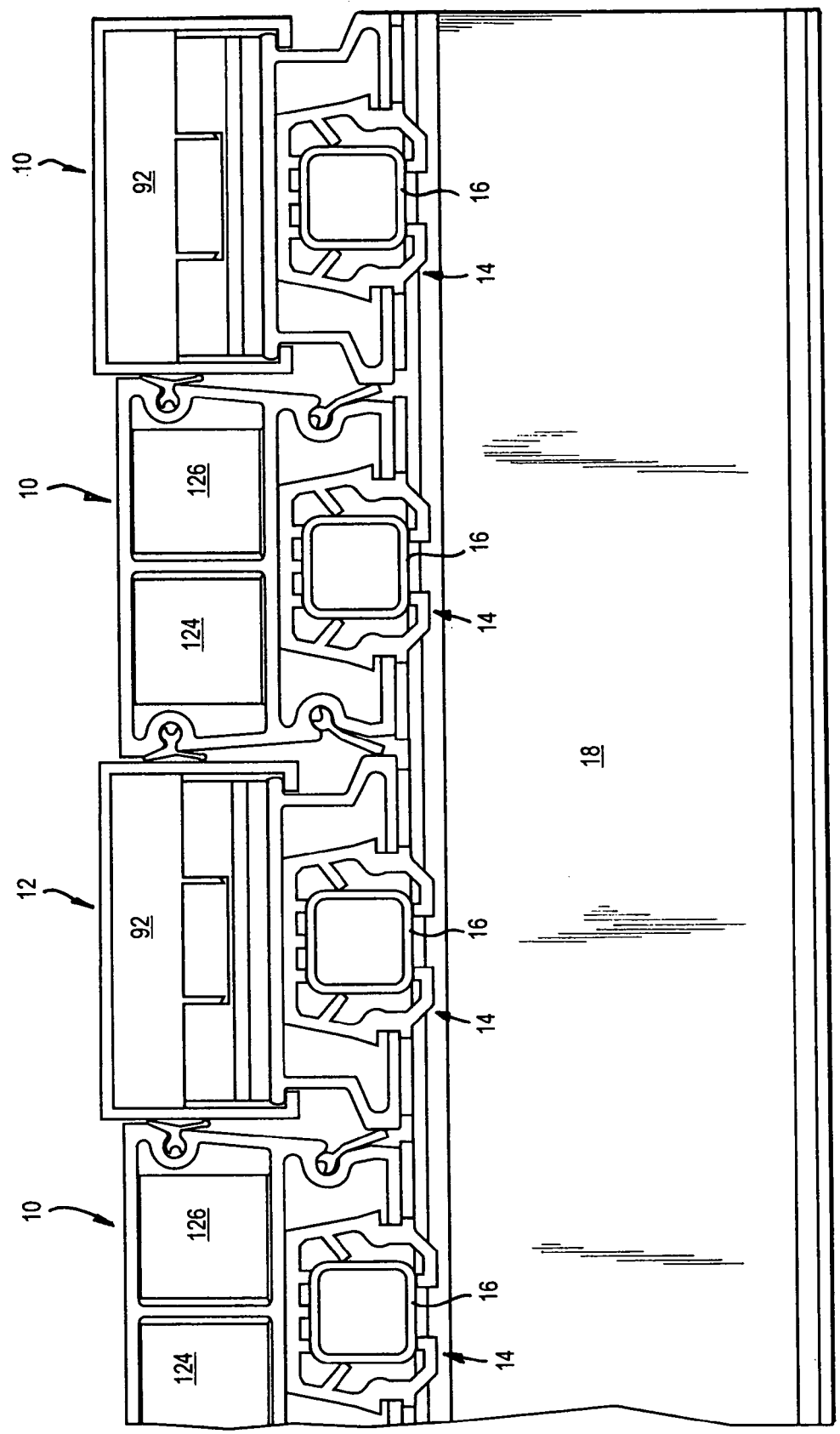
FIG. 4 is a view like FIG. 2, but showing the holding/lifting slats in raised or "up" positions.

Each end bearing 102 has an outer end portion 120 that is connected to the end beam 18', such as by screws 122 (FIG. 8) and a longitudinally split inner end portion comprising elongated side-by-side members 124, 126. As shown by FIGS. 3 and 4, these members 124, 126 fit within longitudinal spaces 128, 130 formed in the upper portion of the conveying slat 10, on opposite sides of the vertical wall 44. As shown by FIG. 3, the members 124, 126 make a snug but loose fit in the spaces 128, 130. As a result, the conveying slat 10 can reciprocate without binding on the members 124, 126. The member 120 is made from a self-lubricated plastic and so any contact between members 124, 126 and the inner surfaces of the longitudinal spaces 128, 130 is a lubricated contact. The end bearings 124, 126 provide an end support for the slats 10. Throughout the remaining length of the conveyor, the slats 10 are supported by the bearings 14, in known fashion.

Figure 11:
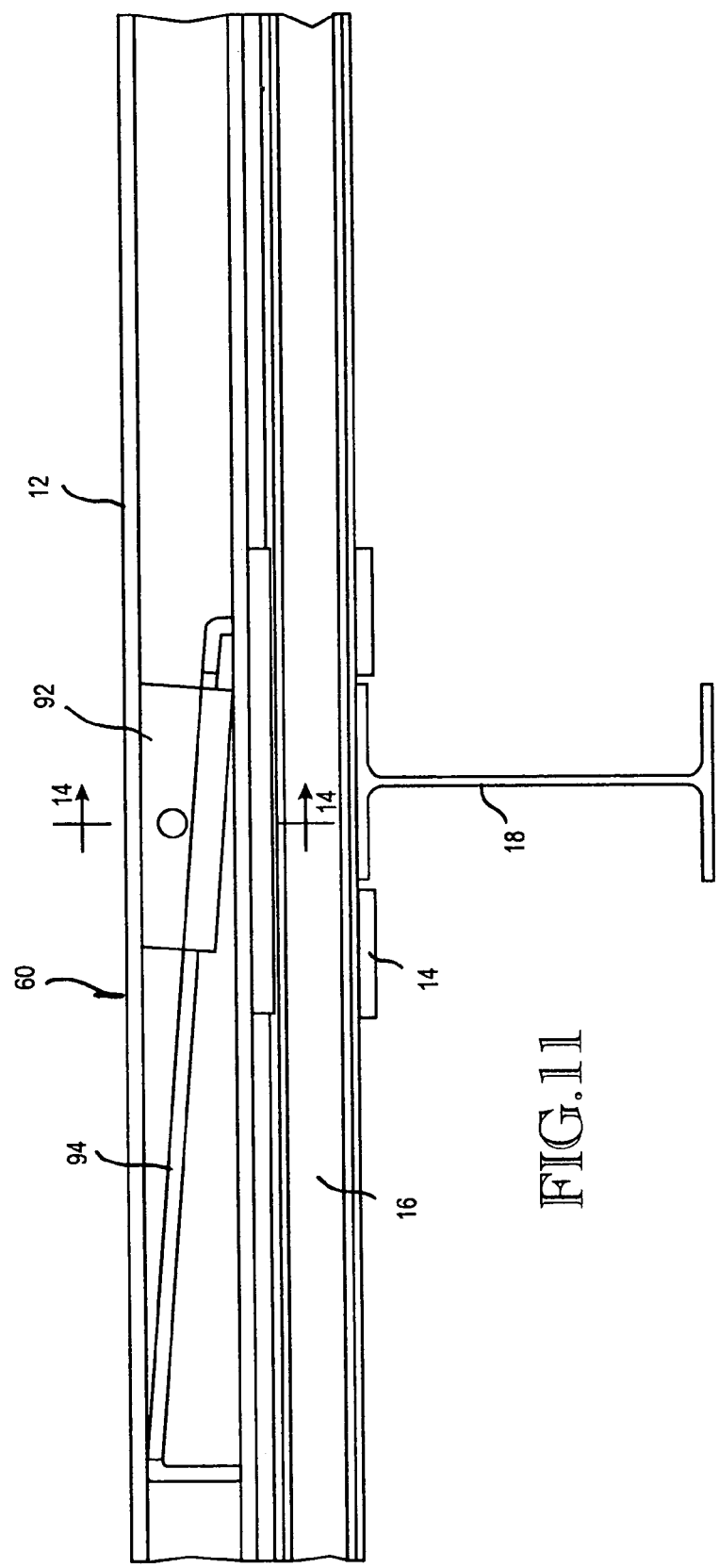
FIG. 11 is a view like FIG. 9, taken at a different location along the length of the lifting/holding slat.
Figure 12:
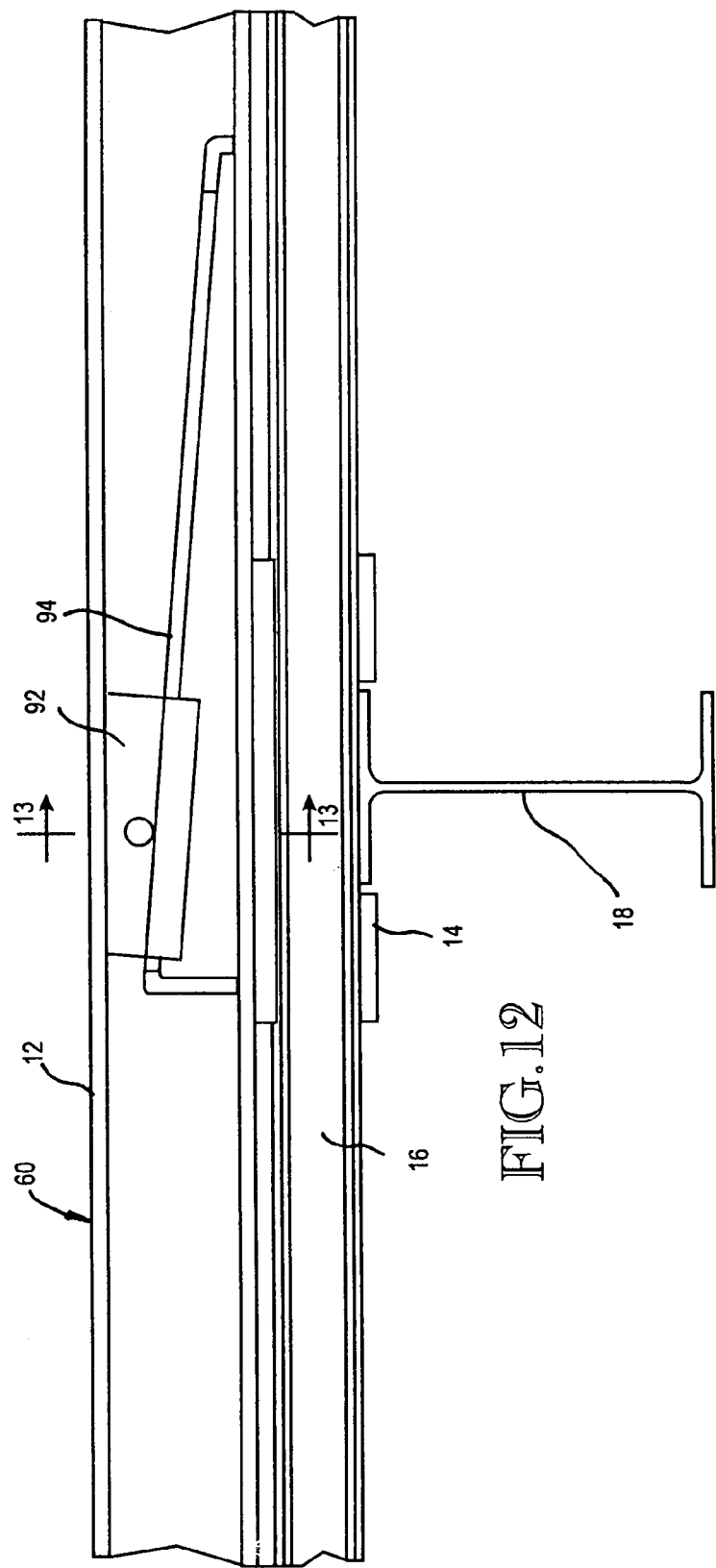
FIG. 12 is a view like FIG. 11, showing the lower portion of the lifting/holding slat extended and the upper portion raised.

As will hereinafter be described in some detail, the conveying slats 10 are moved longitudinally by hydraulic cylinder generated power. The lower portions 62 of the lifting/holding slats 12 are also moved longitudinally by hydraulic cylinder generated power. Referring to FIGS. 9–12, when the slat member 62 moves to the right, the cam members 94 are moved relative to the cam members 92. FIG. 11 shows the members 62 in a start position with the cam 92 in a "down" position. FIG. 12 shows the members 62 moved a full-stroke length to the right and shows the cam 92 in an "up" position. The connection 102 prevents longitudinal movement of the upper slat member 60. As a result, the upper slat members 60 merely move up and down in response to the reciprocation movement of the lower slat member 62.

Figure 15:
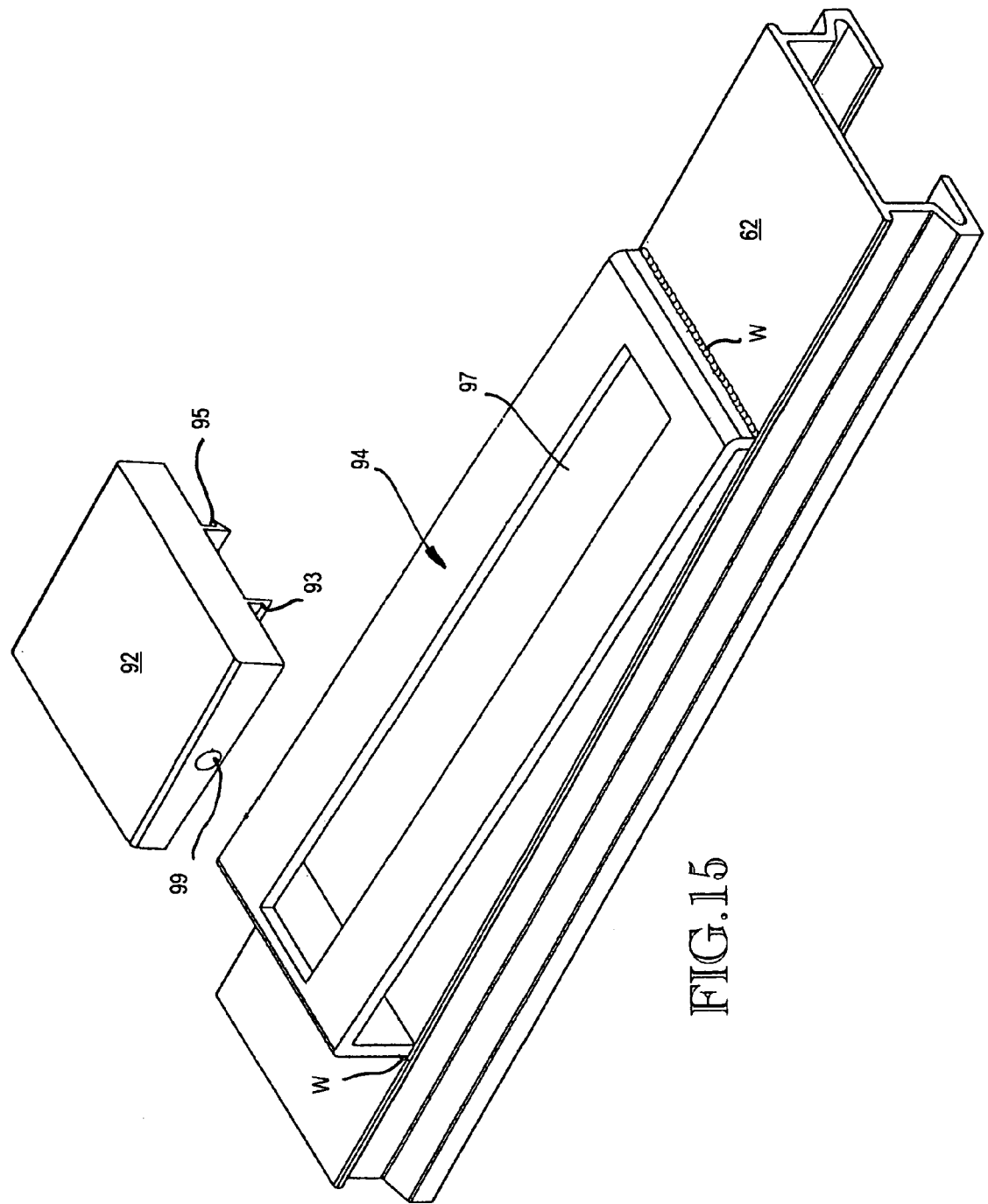
FIG. 15 is a pictorial view of a fragmentary portion of the lower slat member, showing a ramp-like cam that is welded to the top of the lower slat member, and showing a cam that is carried by the upper slat member spaced above a longitudinal slot in the cam that is attached to the lower member.
Figure 16:
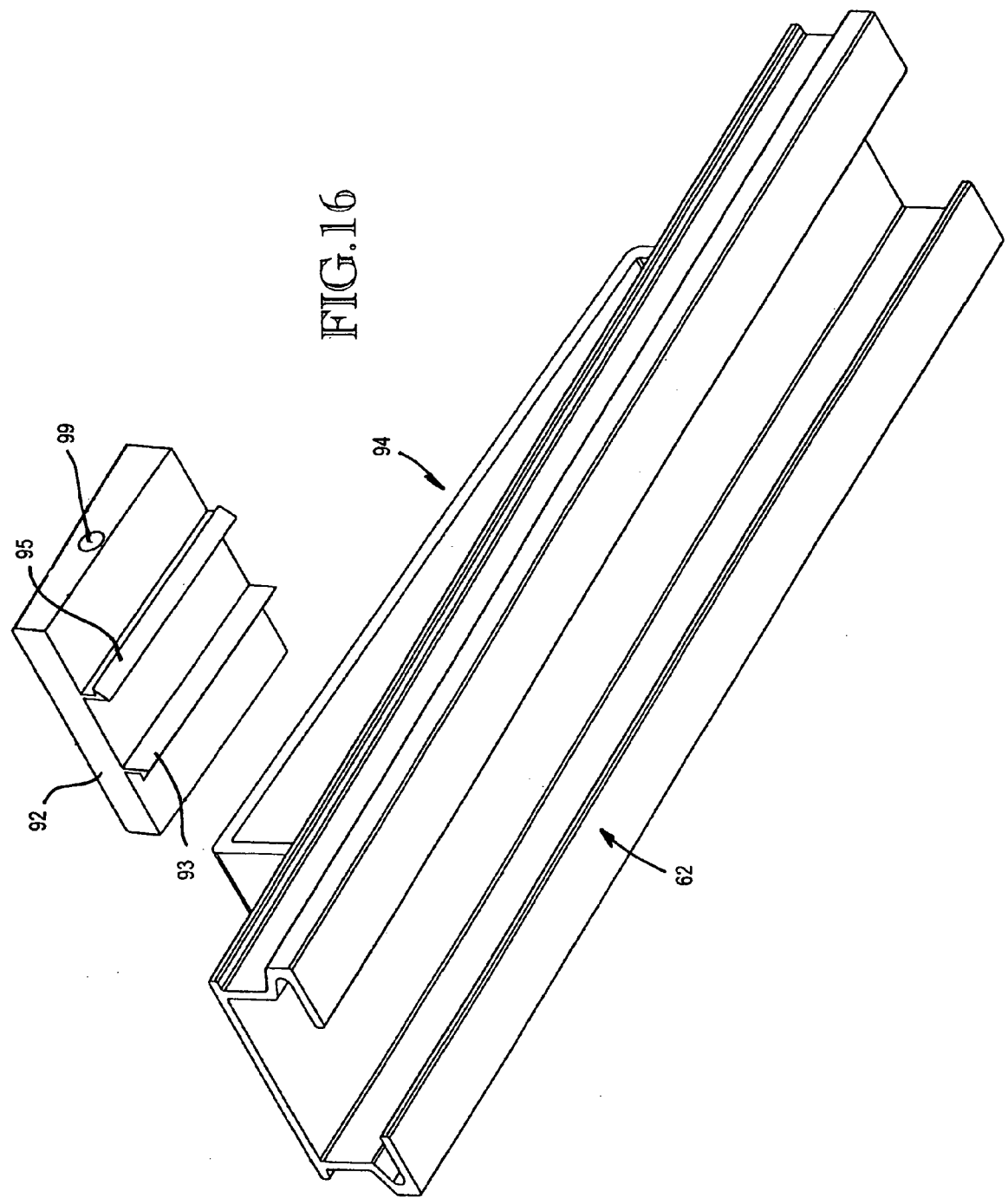
FIG. 16 is an exploded pictorial view of the components in FIG. 15, taken from below the lower slat member and looking upwardly towards the lower slat member and the cam member that is carried by the upper slat member.

FIG. 15 shows that the cam 94 includes a longitudinal slot 97. The view also shows cam 92 spaced vertically from the slot 97. FIG. 16 shows lock flanges 93, 95 which extend length-wise of the cam 92. As shown by FIGS. 13–16, the lock flanges 93, 95 have sloping lower side surfaces which function to cam the flanges 93, 95 into the slot 97. FIGS. 13 and 14 show the lock flanges 93, 95 within the slot 97 with their laterally outwardly extending lock surfaces being disposed below the edge portions of the cam 94 which border the slot 97. The contact between the lock flanges and the edge portions of the member 94 bordering the slot 97 keep the cams 92, 94 vertically together. Accordingly, as the cam 94 moves below the cam 92, the cam 92 will be maintained against the cams 94 as cam 92 either slides up or slides down the sloping upper surface of the cam 94. Accordingly, when the slat members 62 are moved in a direction to the left as shown in FIG. 15, the engagement of the edge portions of the slots 97 and the lock flanges 93, 95 will result in the cams 92 and the upper slat members 60 being pulled downwardly against the cams 94. As the cams 92 move relatively to the right, there is more than a reliance on gravity to lower the cams 92 and the upper slat members 60 down into their "down" position.

Figure 5:
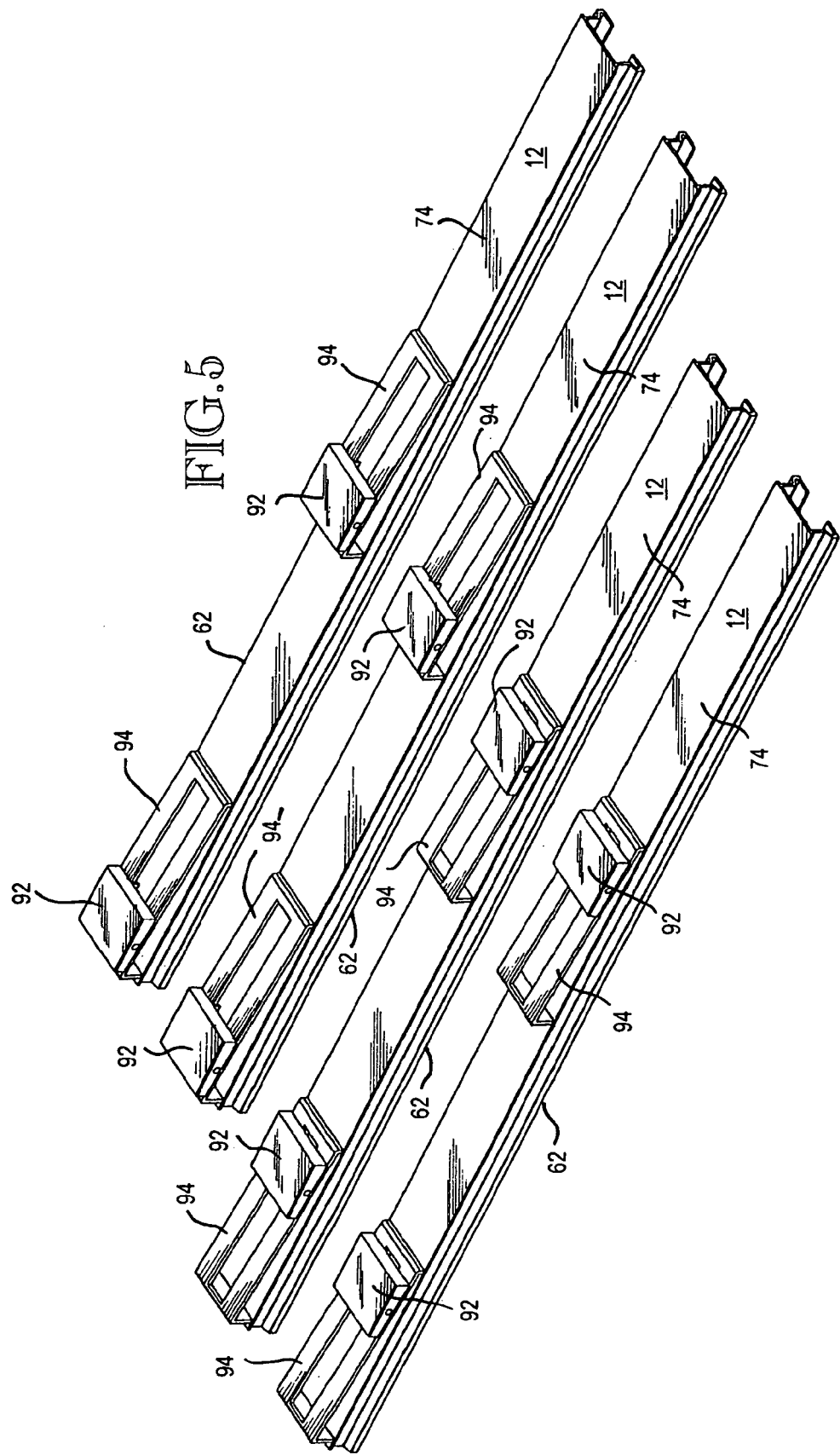
FIG. 5 is a pictorial view of the lower portions of several lifting/holding slats, showing the foreground pair of lower slat members retracted and the background pair of lower slat members extended.
Figure 6:
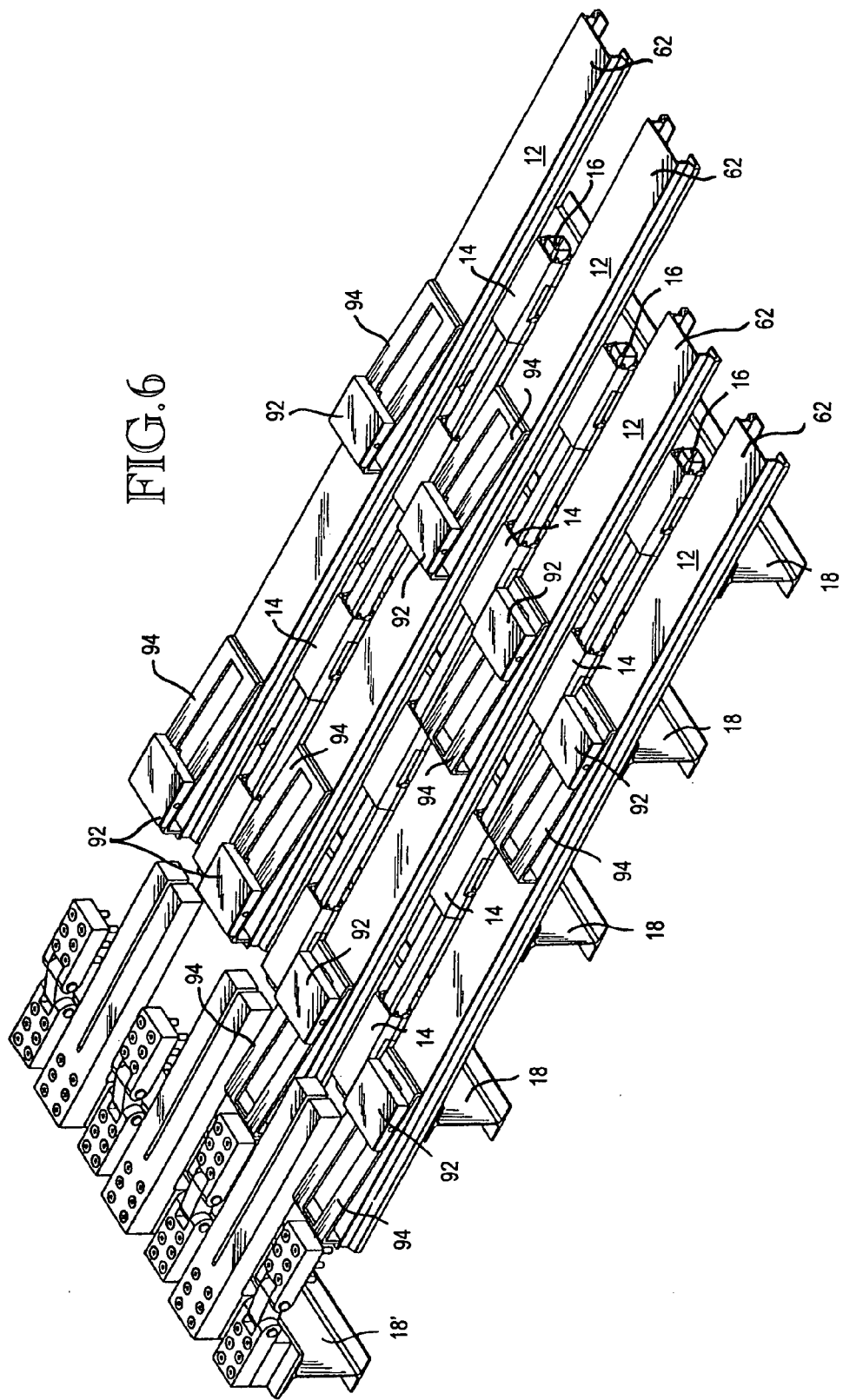
FIG. 6 is a pictorial view similar to FIG. 5, but showing longitudinal support beams and slide bearings for the conveying slats, positioned between the lower portions of the lifting/holding slats.
Figure 7:
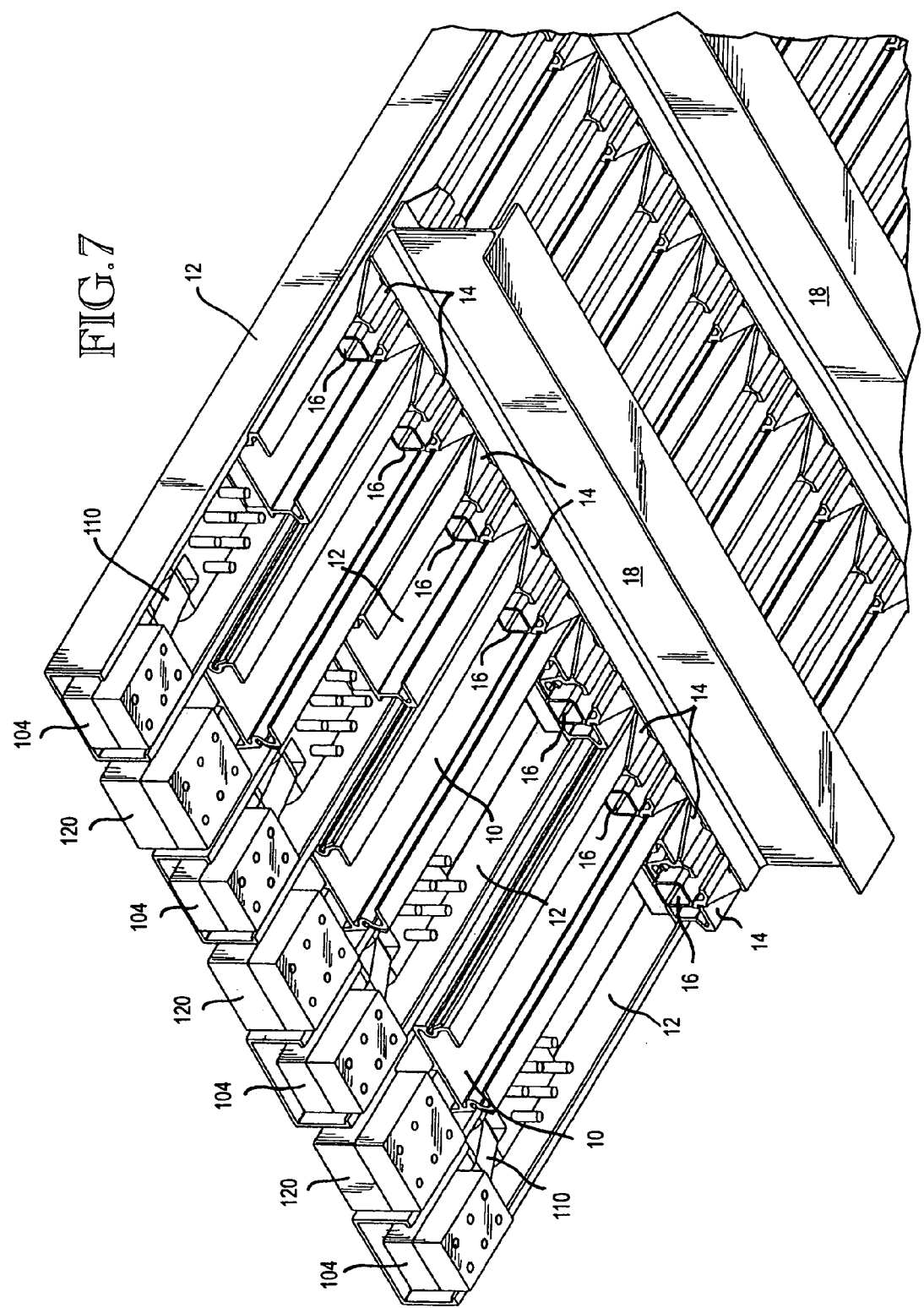
FIG. 7 is a fragmentary pictorial view of the conveyor, taken from below and looking upwardly towards the bottom, one end and one side of the components shown in the view.
Figure 8:
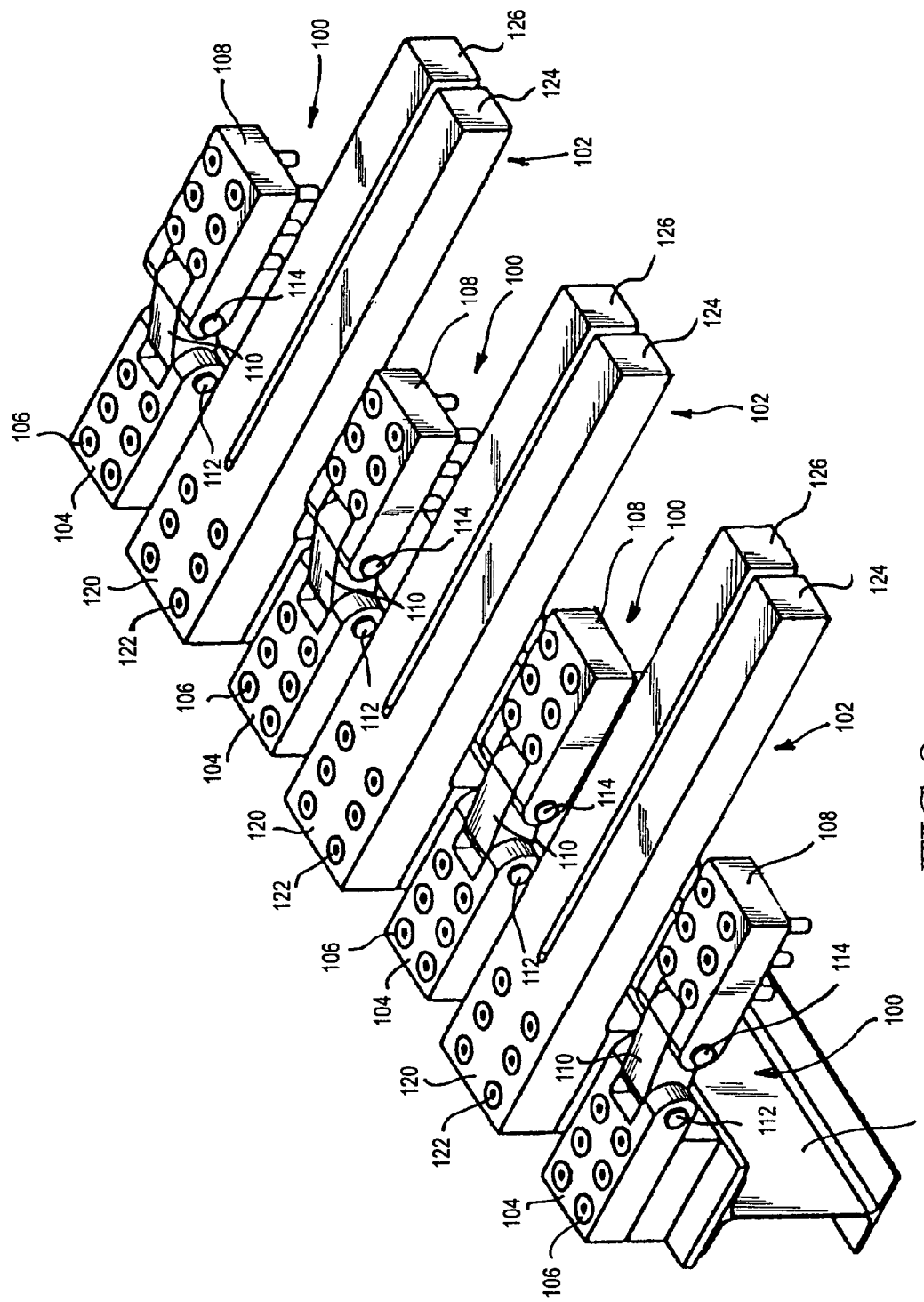
FIG. 8 is an enlarged scale view of the left end portion of FIG. 6.
Figure 9:
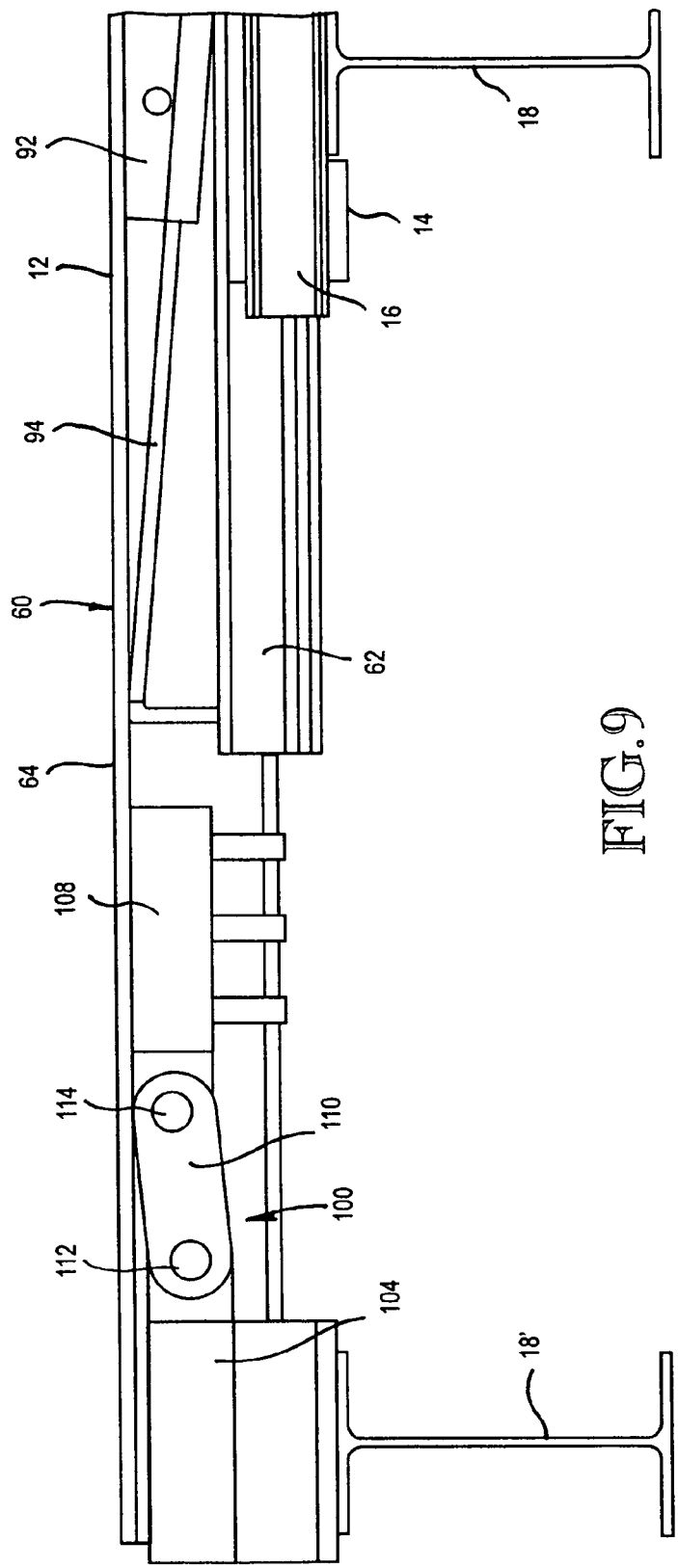
FIG. 9 is a fragmentary side view showing the upper portion of one of the lifting/holding slats in a lowered or "down" position.
Figure 10:
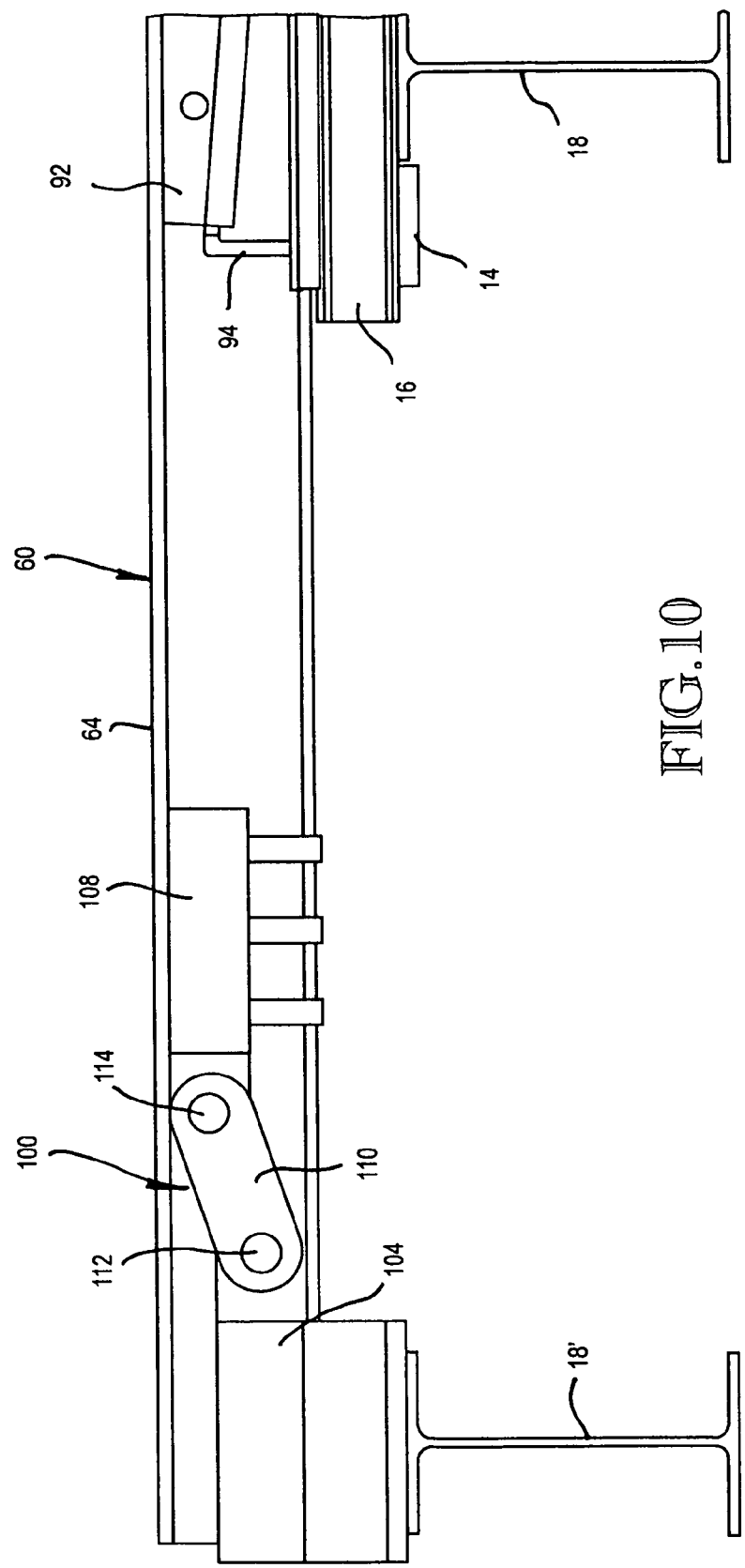
FIG. 10 is a view like FIG. 9 but showing the upper portion of the lifting/holding slat in a raised position.
Figure 17:
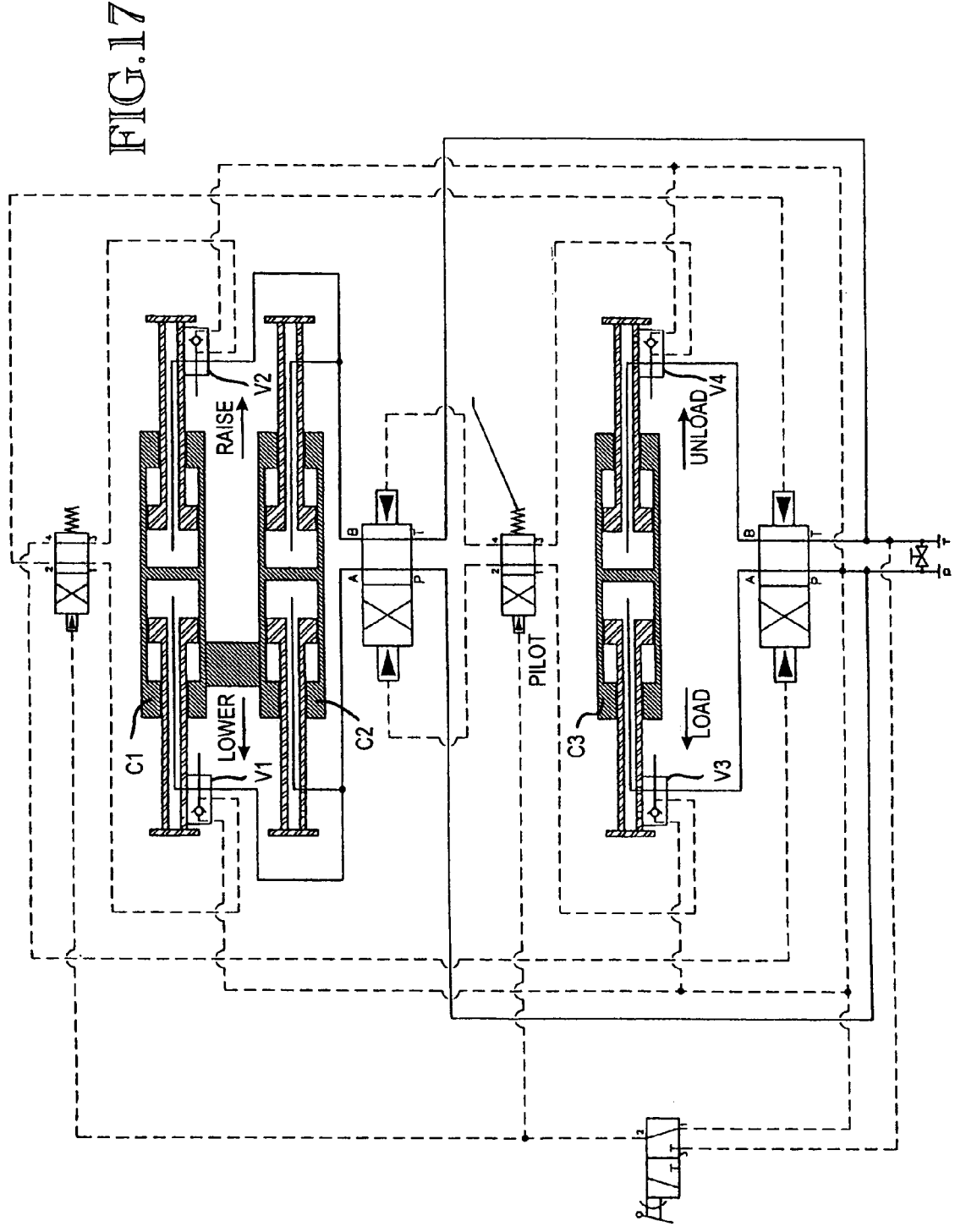
FIG. 17 is a hydraulic power and control system.

FIG. 17 shows a hydraulic power and control system for reciprocating the moving slats 10 and the lower portions 62 of the lifting/holding slats 12. FIG. 17 shows two hydraulic cylinders C1, C2 that are coupled together and connected to a transverse drive beam (not shown). The transverse drive beam is like the drive beam shown in FIG. 5 of the aforementioned U.S. Pat. No. 5,588,522. The drive beam is connected to the lower portions 62 of the lifting/holding slat 12. A third hydraulic cylinder C3 is connected to a second transverse drive beam (not shown) that is connected to the moving slats 10. Limit valves V1, V2 reverse the direction of movement of the cylinders C1, C2 in response to the cylinder reaching the end of their stroke. Limit valves V3, V4 reverse the direction of movement of the cylinder C3 in response to it reaching the end of its stroke. A person skilled in the art can read the diagram disclosed by FIG. 17 and determine how the various components work. Therefore, further explanation is not necessary.

Let it be assumed that several pallets of cargo are on the conveyor and it is desired to unload the conveyor. When the lifting/holding slats 12 are in their "down" position, the top surfaces of the conveying slats 10 are situated above the top surfaces of the lifting/holding slats 12. See FIG. 2. As a result, the pallets are resting on and are supported by the conveying slats 10. The power and control system (FIG. 17) is operated to advance the conveying slats 10 in the unloading direction. When the cylinder C3 reaches the end of its stroke, this condition is sensed and hydraulic fluid is delivered to the cylinders C1, C2, causing them to extend and move the lower slat members 62 towards the discharge end of the conveyor. As the slats 62 move, they move with them the cams 94. This causes the cams 94 to slide under the cams 92, causing the cams 92 and the upper slat members 90 to move upwardly, lifting the palletized load up off from the upper surfaces of the conveying slats 10 (see FIG. 4). When the slat members 60 are in their "up" positions, the upper surfaces of the members 60 are spaced above the upper surfaces of the conveying slats 10. This allows the conveying slats 10 to be retracted back to a start position without them having any influence on the pallets. When the conveying slats 10 are fully retracted, the upper portions 62 of the lifting/holding slats 12 are lowered back to the "down" position that places their upper surfaces below the upper surfaces of the conveying slats 10. Then, the conveying slats 10 are advanced another stroke length for moving the pallets and cargo another step in the unloading direction.

The illustrated embodiments are only examples of the present invention and, therefore, are non-limitive. It is to be understood that many changes in the particular structure, materials and features of the invention may be made without departing from the spirit and scope of the invention. Therefore, it is our intention that the patent rights not be limited by the particular embodiments that are illustrated and described herein, but rather are to be determined by the following claims, interpreted according to accepted doctrines of patent claim interpretation, including use of the doctrine of equivalents and reversal of parts.

What is claimed is:

1. An elongated lifting/holding slat, comprising:
   an upper portion, and
   a lower portion;
   said upper portion including a top, opposite sidewalls extending downwardly from the top, and bottom flanges extending laterally inwardly from the bottoms of the sidewalls;
   said lower portion having a top, sidewalls extending downwardly from the top, laterally inwardly extending bottom flanges at the bottoms of the sidewalls, and laterally outwardly extending lock flanges;

said lock flanges on the lower portion being positioned above the bottom flanges on the upper portion;

a first cam secured to the top of the upper portion and a second cam secured to the upper portion of the slat, said first and second cams being housed within the upper portion of the slat, between the top of the lower portion and the top of the upper portion, said cam on the top of the lower portion of the slat being adapted to contact the cam carried by the upper portion of the slat; and said lower portion of the slat being adapted to be movable longitudinally in one direction to cause the lower cams to slide along the upper cams and raise the upper portion of the slat relative to the lower portion of the slat and, and movable in the opposite direction to lower the upper portion of the slat relative to the lower portion of the slat.

2. The lifting/holding slat of claim 1, comprising aligned openings in the sidewalls of the upper portion of the slat and in the second cam, and a lock pin extending through said aligned openings and connecting the second cam to the upper portion of the slat.

3. The lifting/holding slat of claim 1, further comprising an interlock between the two cams, holding the two cams together as the first cam slides relative to the second cam.

4. The lifting/holding slat of claim 3, wherein the first cam includes a sloping surface confronting the second cam, and the second cam has a sloping surface confronting the first cam, and one of said cams includes a longitudinal slot bordered by inner edges and the other cam includes a slot follower that extends into the slot and has laterally outwardly projecting flanges that underlie the inner edges of the slot.

5. A conveyor, comprising:

a plurality of elongated, laterally spaced apart lifting/holding slats;

a plurality of elongated, laterally spaced apart conveying slats, positioned between the lifting/holding slats;

bearings supporting the conveying slats for longitudinal movement from a start position to an advanced position and from the advanced position back to the start position;

said lifting/holding slats having upper and lower portions, said upper portion being movable vertically relative to the lower portion, between an "up" position in which upper surfaces of the upper portions are above upper surfaces on the conveying slats, and "down" positions in which the upper surfaces on the upper portions of the lifting/holding slats are below the upper surfaces on the conveying slats;

first cams on the lower portions of the lifting/holding slats and the second cams on the upper portions of the lifting/holding slats, wherein said lower portion of the lifting/holding slats are movable longitudinally and longitudinal movement in one direction moves the first cams against the second cams, for moving the upper portions of the lifting/holding slats from their "down" positions into their "up" positions, and longitudinal movement of the lower portions in the opposite direction causes the first and second cams to move the upper portions of the lifting/holding slats from their "up" positions down into their "down" positions.

6. A conveyor, comprising:

a plurality of elongated, laterally spaced apart conveying slats;

a plurality of elongated, laterally spaced apart lifting/holding slats between the conveying slats;

said conveying slats each having a top, a pair of opposite sidewalls depending from the top, a pair of inwardly directed bottom flanges extending laterally inwardly from bottom portions of the sidewalls, a horizontal partition wall extending between and interconnecting the sidewalls below the top and above the bottom flanges, and at least one reinforcement wall extending between and interconnecting the top and the partition wall;

said lifting/holding slats each comprising a lower portion and an upper portion, said lower portion comprising a top, opposite sidewalls depending from the top, bottom flanges extending laterally inwardly from bottom portions of the sidewalls, and lock flanges extending laterally outwardly from an upper region of said lower portion;

said upper portion having a top, sidewalls extending downwardly from the top, and bottom flanges extending laterally inwardly from top portions of the sidewalls, below the lock flanges on the lower portion;

said upper portion being movable vertically relative to the lower portion and having an upper position in which the bottom flanges on the upper portion are up adjacent the lock flanges on the lower portion, and the top of the upper portion is above the top of the conveying slats, and a lower position in which the bottom flanges are spaced vertically below the lock flanges on the lower portion and the top of the upper portion is below the top of the conveying slats; and wherein the lower portion of each lifting/holding slat includes a first cam element and the upper portion of the slat includes a second cam element, said first and second cam elements being housed within the upper portion of the slat, between the top of the lower portion and the top of the upper portion.

7. The conveyor of claim 6, wherein the lower portion of the lifting/holding slat includes an elongated seal-receiving slot on at least one of its sides, spaced below the lock flange on its side.

8. The conveyor of claim 6, wherein the bottom portions of the lifting/holding slats each includes an elongated seal-receiving surface on each of its sides.

9. The conveyor of claim 6, wherein the lower portion of the slat is adapted to be movable longitudinally to cause the cam elements to slide along each other and raise the upper portion of the lifting/holding slat relative to the lower portion when moved in one direction and to lower the upper portion relative to the lower portion when moved in the opposite direction.

10. The conveyor of claim 9, further comprising a connector member at one end of each upper portion, that includes a first end that is pivotally connected to the upper portion and a second end that is pivotally connected to an anchor structure positioned endwise of the end of the upper portion, said connection allowing the upper portion to move up and down in response to the action of the cam elements without moving longitudinally.

* * * * *